(12) United States Patent  
Mathys et al.

(10) Patent No.: US 9,381,547 B1  
(45) Date of Patent: Jul. 5, 2016

(54) VEHICLE WASH FOAM APPLICATOR SYSTEM

(71) Applicant: Cleaning Systems, Inc., DePere, WI (US)

(72) Inventors: Daniel J. Mathys, Pulaski, WI (US); Robert J. Kropp, DePere, WI (US)

(73) Assignee: Cleaning Systems, Inc., DePere, WI (US)

( * ) Notice: Subject to any disclaimer, the term of this patent is extended or adjusted under 35 U.S.C. 154(b) by 0 days.

(21) Appl. No.: 14/581,444

(22) Filed: Dec. 23, 2014

(51) Int. Cl.
| | |
|---|---|
| *B60S 3/04* | (2006.01) |
| *B05B 1/20* | (2006.01) |
| *B05B 7/00* | (2006.01) |
| *B05B 7/04* | (2006.01) |
| *B08B 3/02* | (2006.01) |

(52) U.S. Cl.
CPC ... *B08B 3/02* (2013.01); *B05B 1/20* (2013.01); *B05B 7/0025* (2013.01); *B05B 7/0416* (2013.01); *B60S 3/04* (2013.01)

(58) Field of Classification Search
CPC .......... B60S 3/04; B05B 1/20; B05B 7/0025; B05B 7/0416; B05B 7/0433
See application file for complete search history.

(56) References Cited

U.S. PATENT DOCUMENTS

| 4,912,782 A * | 4/1990 | Robbins ................... B05B 1/20 239/520 |
| 2013/0192643 A1* | 8/2013 | Ennis ..................... B08B 3/041 134/18 |
| 2014/0231545 A1 | 8/2014 | Analetto |

OTHER PUBLICATIONS

US 8,418,701, Apr. 2013, Ennis (withdrawn).

* cited by examiner

*Primary Examiner* — Darren W Gorman  
(74) *Attorney, Agent, or Firm* — Neustel Law Offices; Michael S. Neustel

(57) ABSTRACT

A vehicle wash foam applicator system for efficiently generating and dispersing foam in a vehicle wash. The vehicle wash foam applicator system generally includes an outer tube having at least one foam outlet port to discharge foam onto a vehicle, at least one liquid inlet port fluidly connected to the outer tube to introduce a liquid into the interior of the outer tube, and an inner tube positioned within the outer tube. The inner tube includes at least one air outlet port to discharge pressured air into the interior of the outer tube to generate foam.

36 Claims, 13 Drawing Sheets

VEHICLE WASH FOAM APPLICATOR SYSTEM

CROSS REFERENCE TO RELATED APPLICATIONS

Not applicable to this application.

STATEMENT REGARDING FEDERALLY SPONSORED RESEARCH OR DEVELOPMENT

Not applicable to this application.

BACKGROUND OF THE INVENTION

1. Field of the Invention

The present invention relates generally to a foam applicator for vehicle washes and more specifically it relates to a vehicle wash foam applicator system for efficiently generating and dispersing foam in a vehicle wash.

2. Description of the Related Art

Any discussion of the related art throughout the specification should in no way be considered as an admission that such related art is widely known or forms part of common general knowledge in the field.

Vehicle washes utilize foam applicators to apply various types of chemicals to a vehicle prior to washing a vehicle known as presoak foam, during the washing of a vehicle known as cleaner foam and after washing a vehicle known as polish and conditioner foam. For example, a foam applicator may apply a foaming detergent to a vehicle prior to washing. In addition, a foam protection product (e.g. wax) may be applied to a vehicle towards the end of a vehicle wash.

One type of conventional vehicle wash foam applicator is constructed with an inlet, mixing air and water/solution mixtures together in a chamber, then pushing it through a mesh or area of small openings allowing the mixed water and solution mixture to coat the area and the air passing through agitates and foams up the mixture and exits out of the foam generation area to different types of application orifices. These devices require maintenance to keep the foam generating units free of debris, sludge build up, and the mixing device substrate from getting compacted in the device and limiting flow through the unit. U.S. Patent Publication No. 2014/0231545 filed by Analetto discloses an exemplary Foam Generator, Nozzle for a Foam Generator and Carwash Having a Foam Generator.

Another type of conventional vehicle wash foam applicator is constructed of a trough filled to a level with mixed solution to be foamed with an air manifold submerged in the trough. The air manifold forces air into the solution and makes it bubble over the edge of the trough. U.S. Pat. No. 8,418,701 to Ennis for a Waterfall Tank System discloses an exemplary trough style foam applicator.

Because of the inherent problems with the related art, there is a need for a new and improved vehicle wash foam applicator system for efficiently generating and dispersing foam in a vehicle wash.

BRIEF SUMMARY OF THE INVENTION

The invention generally relates to a foam applicator for vehicle washes which includes an outer tube having at least one foam outlet port to discharge foam onto a vehicle, at least one liquid inlet port fluidly connected to the outer tube to introduce a liquid into the interior of the outer tube, and an inner tube positioned within the outer tube. The inner tube includes at least one air outlet port to discharge pressured air into the interior of the outer tube to generate foam.

There has thus been outlined, rather broadly, some of the features of the invention in order that the detailed description thereof may be better understood, and in order that the present contribution to the art may be better appreciated. There are additional features of the invention that will be described hereinafter and that will form the subject matter of the claims appended hereto. In this respect, before explaining at least one embodiment of the invention in detail, it is to be understood that the invention is not limited in its application to the details of construction or to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE INVENTION

A. Overview

Figure 1:
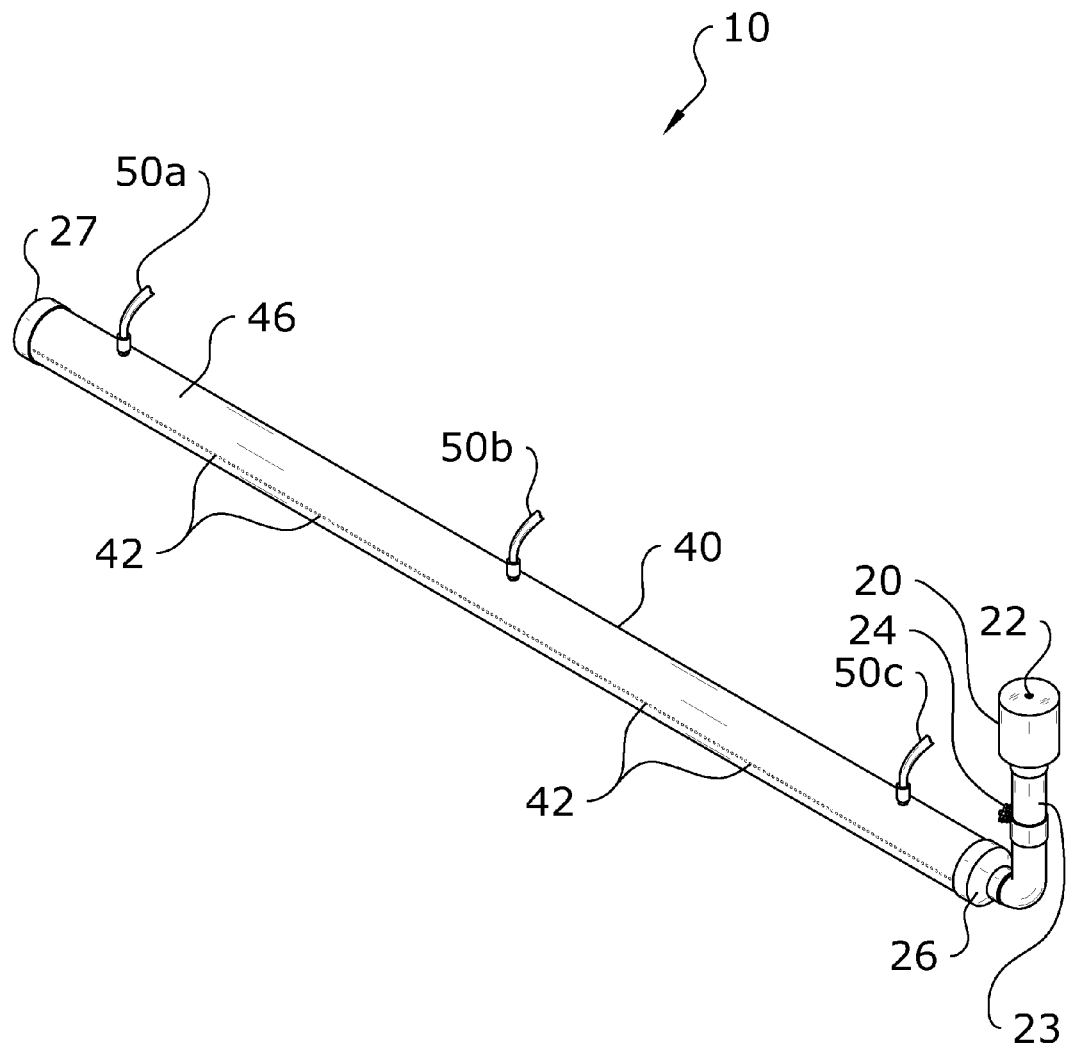
FIG. 1 is an upper perspective view of the present invention.

Turning now descriptively to the drawings, in which similar reference characters denote similar elements throughout the several views, FIGS. 1 through 12 illustrate a vehicle wash foam applicator system 10, which comprises an outer tube 40 having at least one foam outlet port 42 to discharge foam onto a vehicle 12, at least one liquid inlet port 52 fluidly connected to the outer tube 40 to introduce a liquid into the interior of the outer tube 40, and an inner tube 30 positioned within the outer tube 40. The inner tube 30 includes at least one air outlet port 32 to discharge pressured air into the interior of the outer tube 40 to generate foam. The discharged foam 16 may have various characteristics such as a stream effect, a snow effect and the like.

The present invention may be utilized to generate and discharge various types of foam for a vehicle wash such as, but not limited to, presoak foam, cleaner foam, soap/detergent foam, polish foam, conditioner foam and/or wax foam. The present invention may also be utilized in various types of existing and new vehicle washes such as tunnel washes where conveyors push or pull the vehicle 12 through a series of fixed cleaning mechanisms or in-bay automatics that consist of an automatic machine that moves over the stationary vehicle 12. The present is supported above the vehicle 12 (e.g. a car, a pickup, a truck, a van, etc.) with a frame 19 attached to at least one end of the invention, wherein the frame 19 may be attached to the floor, the wall or a ceiling of a vehicle wash.

B. Outer Tube

FIGS. 1 through 4 illustrate the outer tube 40 having a first length. The outer tube 40 is comprised of an elongated structure and is further preferably comprised of a straight elongated structure. However, it can be appreciated that the outer tube 40 may be non-straight such as curved or angled. The outer tube 40 may be constructed of various types of materials such as plastic, metal or composite.

The outer tube 40 is preferably horizontally aligned and supported in a conventional vehicle wash (e.g. a car wash, a truck wash, etc.) where the discharged foam 16 is to be applied to the vehicle 12. The outer tube 40 is horizontally aligned and positioned above the vehicle 12. The longitudinal axis of the outer tube 40 is preferably transverse with respect to the length of the vehicle 12 being washed. The first length of the outer tube 40 is preferably equal to or greater than the width of the vehicle 12 being washed to ensure that the discharged foam 16 substantially covers the entire surface of the vehicle 12. For example, it is preferable that the first length of the outer tube 40 be at least 7 feet or more. However, the length may be less than 7 feet for smaller applications.

The outer tube 40 has a first end and an opposing second end. The outer tube 40 further includes an exterior surface 46 and an interior cavity defined by an interior surface 44 that receives the inner tube 30. A first end cover 26 is attached to the first end of the outer tube 40 and a second end cover 27 is attached to the opposing second end of the outer tube 40 to seal the outer tube 40 as illustrated in FIGS. 1 through 4 of the drawings.

Figure 6:
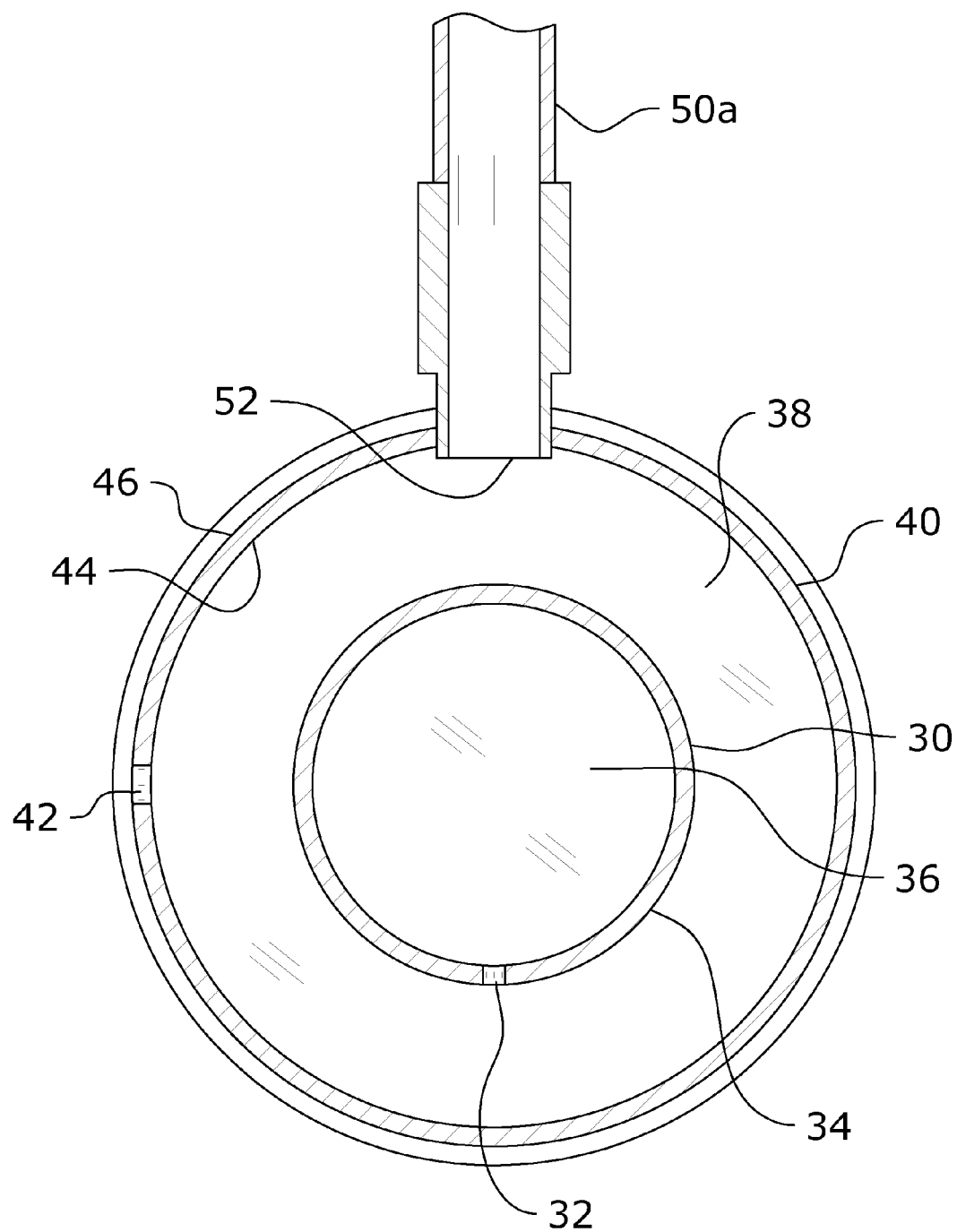
FIG. 6 is a cross sectional view taken along line 6-6 of FIG. 4.
Figure 7:
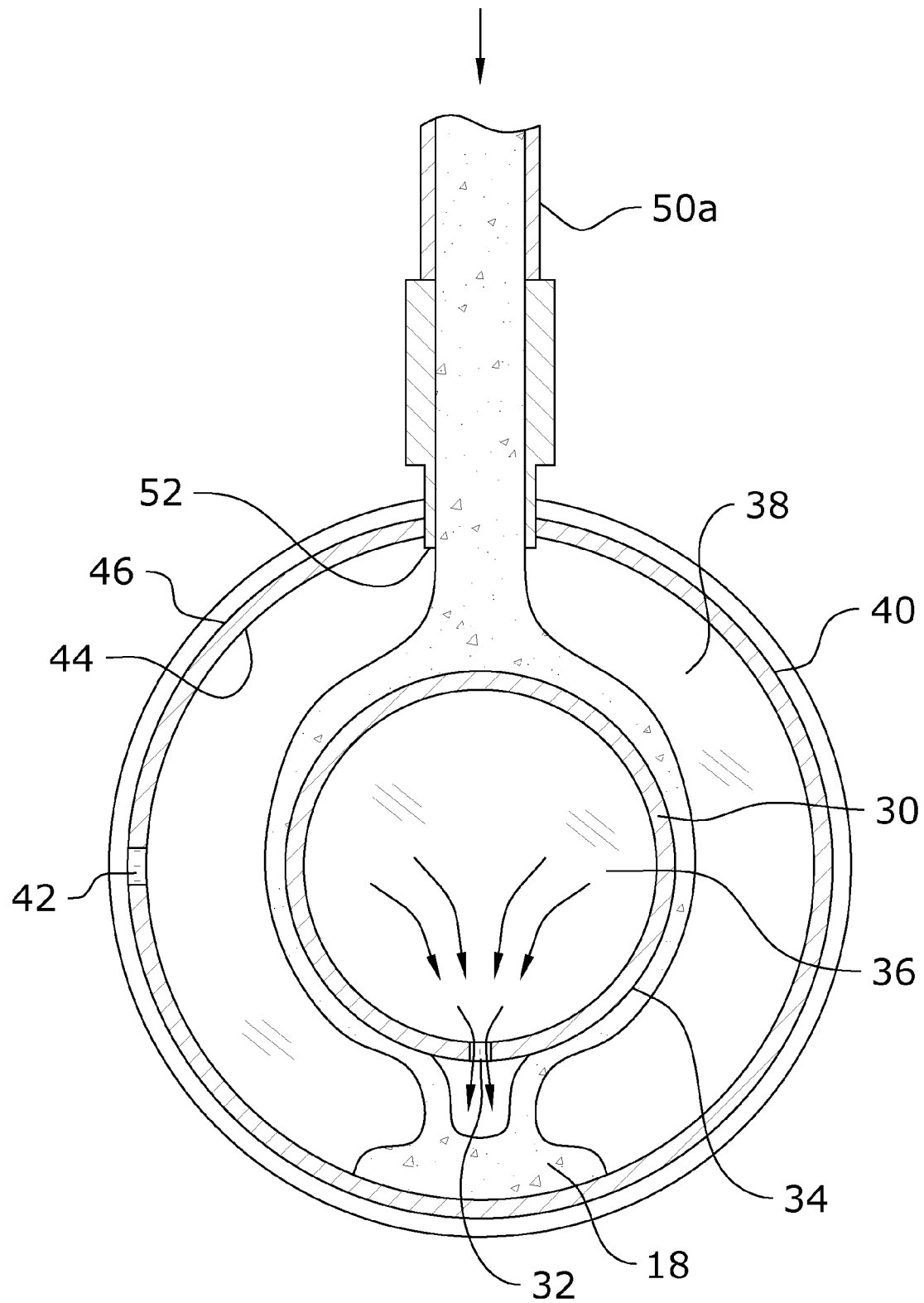
FIG. 7 is the cross sectional view of FIG. 6 with a mixed solution and pressurized air entering the intermediate space mixing together to generate foam.
Figure 8:
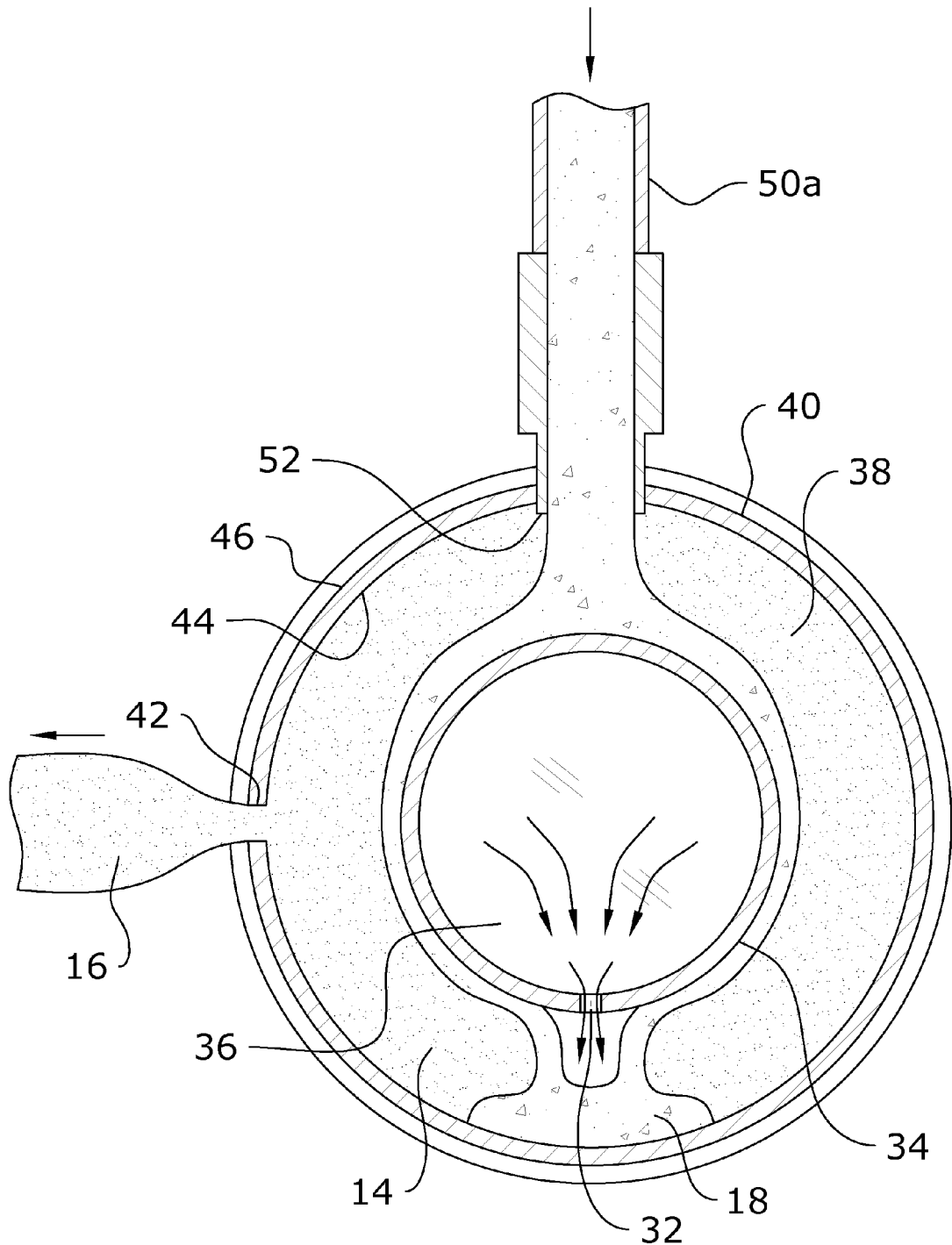
FIG. 8 is the cross sectional view of FIG. 6 with the generated foam filling the intermediate space and being discharged outwardly in a horizontal manner from the foam outlet port.

The outer tube 40 preferably has a circular cross sectional shape as illustrated in FIGS. 6 through 8 of the drawings. However, the outer tube 40 may have a non-circular shape such as, but not limited to, rectangular, square, oval, triangular and the like.

C. Liquid Inlet Port(s)

The outer tube 40 includes at least one liquid inlet port 52 fluidly connected to an interior of the outer tube 40. The liquid inlet port 52 is adapted to be fluidly connected to a liquid source. The liquid source provides a pressurized mixed liquid solution 18 to the liquid inlet port 52 via a mixed solution line 50*a-c*.

The mixed liquid solution 18 may be comprised of various types of foaming chemicals mixed with water or other liquid prior to entry into the outer tube 40. The mixed liquid solution 18 may have various ratios of foaming chemical to water as is typically utilized within the vehicle wash industry. The mixed liquid solution 18 may be comprised of the foam chemical mixed with water at the vehicle wash or prior to being delivered to the vehicle wash. The flowrate of the mixed liquid depends upon the foaming characteristics preferred for the discharged foam 16 along with the foaming characteristics of the mixed liquid solution 18. Alternatively, the foaming chemical may be concurrently applied to the interior of the outer tube 40 with the water, but such an arrangement will make adequate mixing of the foaming chemical difficult.

Figure 10:
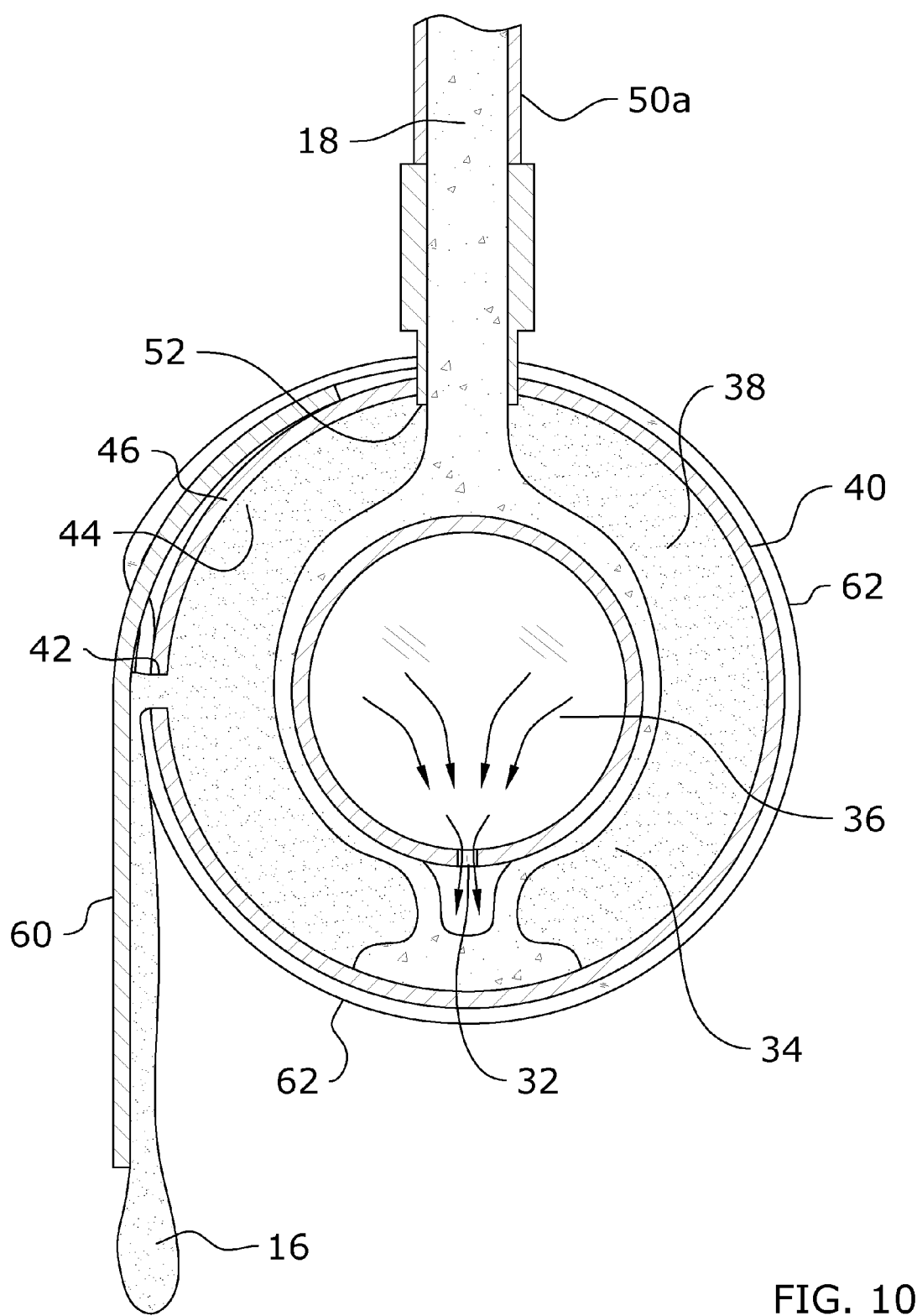
FIG. 10 is a cross sectional view taken along line 10-10 of FIG. 9.
Figure 11:
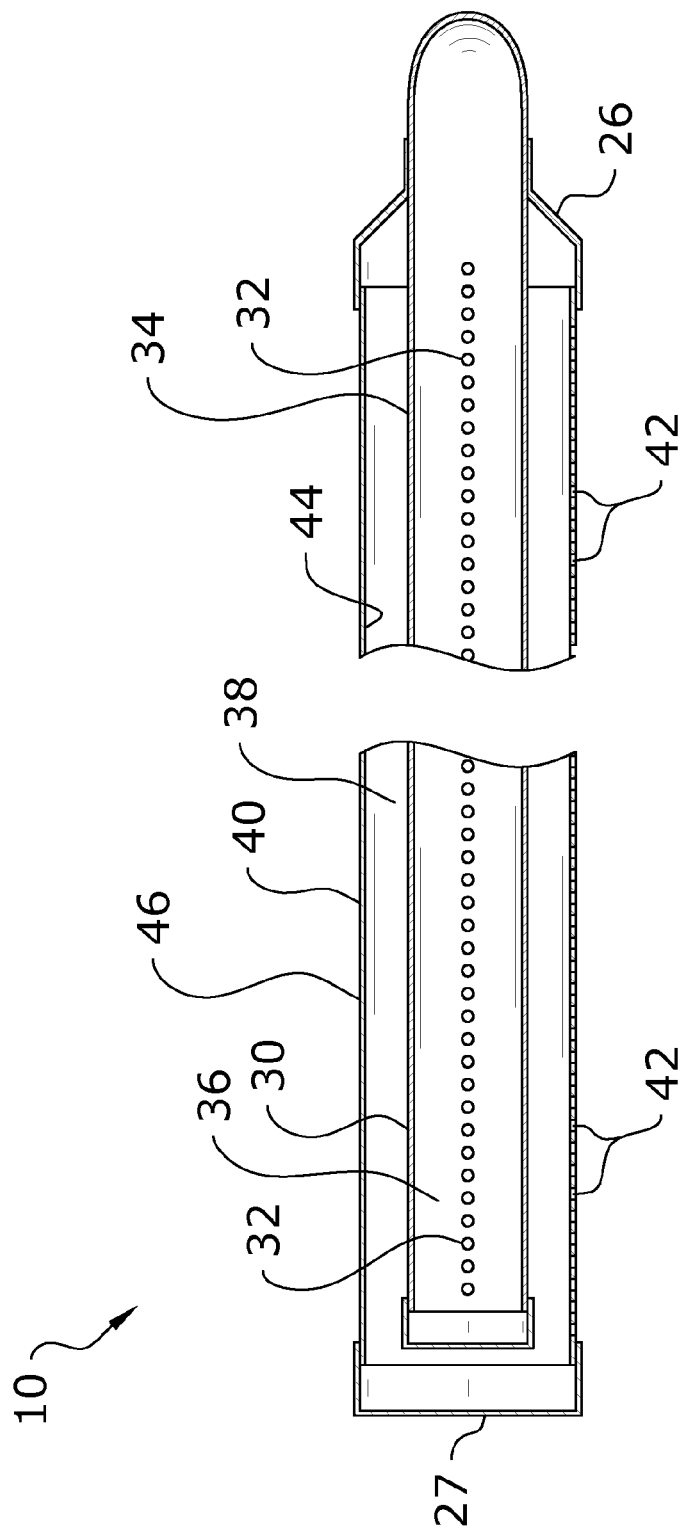
FIG. 11 is a cross sectional view taken along line 11-11 of FIG. 4.

The liquid inlet port 52 is positioned within an upper portion of the outer tube 40 and is preferably positioned in a centered uppermost location within the outer tube 40 as illustrated in FIGS. 6 through 8 of the drawings. The liquid inlet port 52 may be comprised of any structure or configuration capable of delivering the liquid into the interior of the outer tube 40. For example, the liquid inlet port 52 may be comprised of a nozzle that dispenses the mixed liquid solution 18 into the interior of the outer tube 40 and the intermediate space 38. The liquid inlet port 52 may dispense the mixed liquid solution 18 in a stream and/or a spray. Also, the liquid inlet port 52 preferably dispenses the mixed liquid solution 18 downwardly in a vertical manner onto the center upper surface of the inner tube 30 as illustrated in FIGS. 7, 8 and 10 of the drawings. By dispensing the mixed liquid solution 18 downwardly and centered with respect to the inner tube 30, the mixed liquid solution 18 is dispersed relatively evenly on both sides of the inner tube 30 thereby increasing the effectiveness of generating the generated foam 14 as further illustrated in FIGS. 7, 8 and 10 of the drawings.

A plurality of liquid inlet ports 52 are preferably utilized within the present invention to provide sufficient distribution of the mixed liquid solution 18 along the length of the outer tube 40 and the inner tube 30. FIGS. 1 through 4 illustrate the usage of three liquid inlet ports 52 that are fluidly connected to three corresponding mixed solution lines 50*a-c*. The liquid inlet ports 52 are preferably equidistantly spaced apart but may also be spaced apart in a varying manner.

Figure 12:
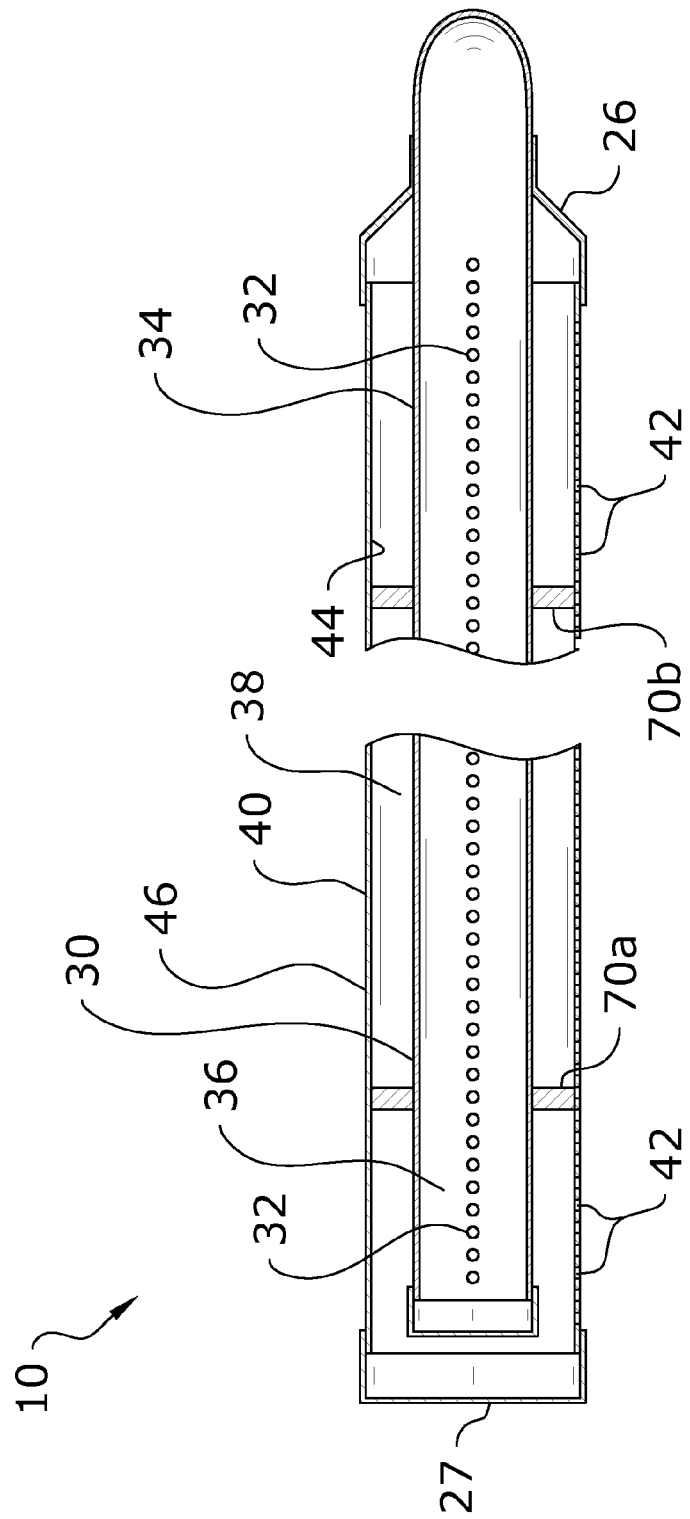
FIG. 12 is a cross sectional view taken along line 11-11 of FIG. 4 illustrating the usage of one or more partitions to provide separate intermediate chambers to mix different foaming chemicals separate from one another.

While the mixed solution lines 50*a-c* and the corresponding liquid inlet ports 52 may provide the same type of mixed liquid solution 18, different mixed liquid solutions 18 may be provided to one or more of the mixed solution lines 50*a-c* and the corresponding liquid inlet ports 52 to provide the ability to dispense different types of foam from the invention. In addition, each of the liquid inlet ports 52 may inject a different mixed liquid solution 18 into a separate compartment within the intermediate space 38 with partitions 70 sealing each of the compartments from one another as illustrated in FIG. 12 of the drawings. The partitions 70 extend around the perimeter of the outer surface 34 of the inner tube 30 and the entire interior surface 44 of the outer tube 40 to maintain a plurality of separate sealed compartments.

D. Foam Outlet Port(s)

Figure 2:
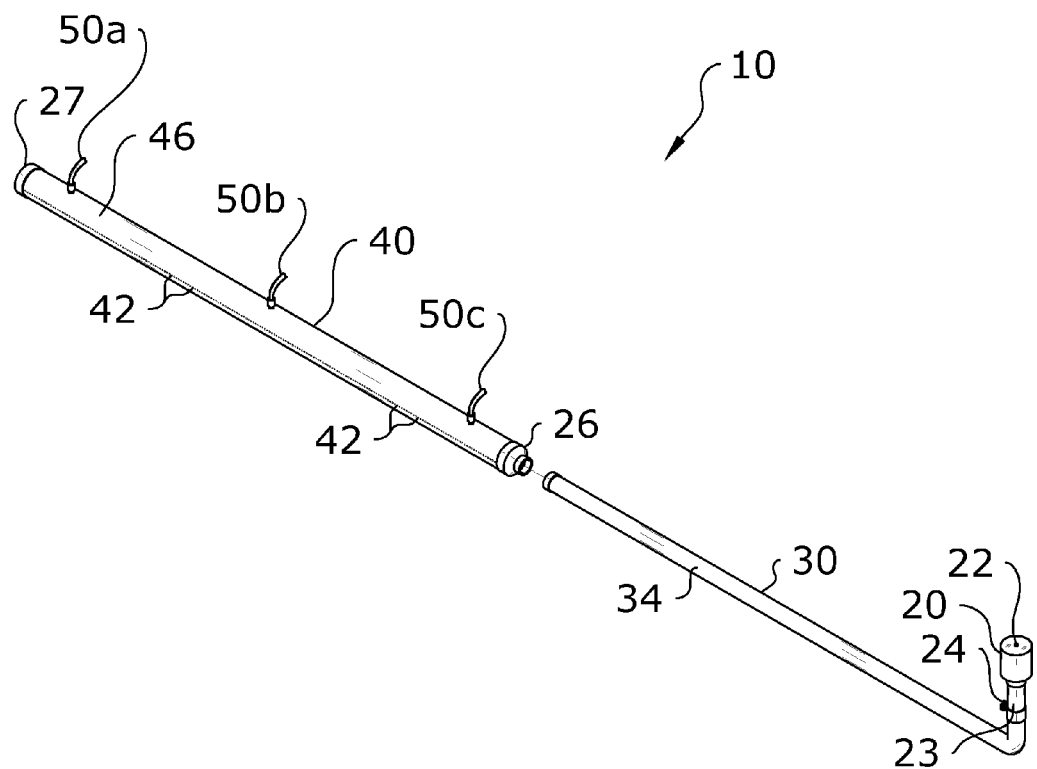
FIG. 2 is an exploded upper perspective view.
Figure 3A:
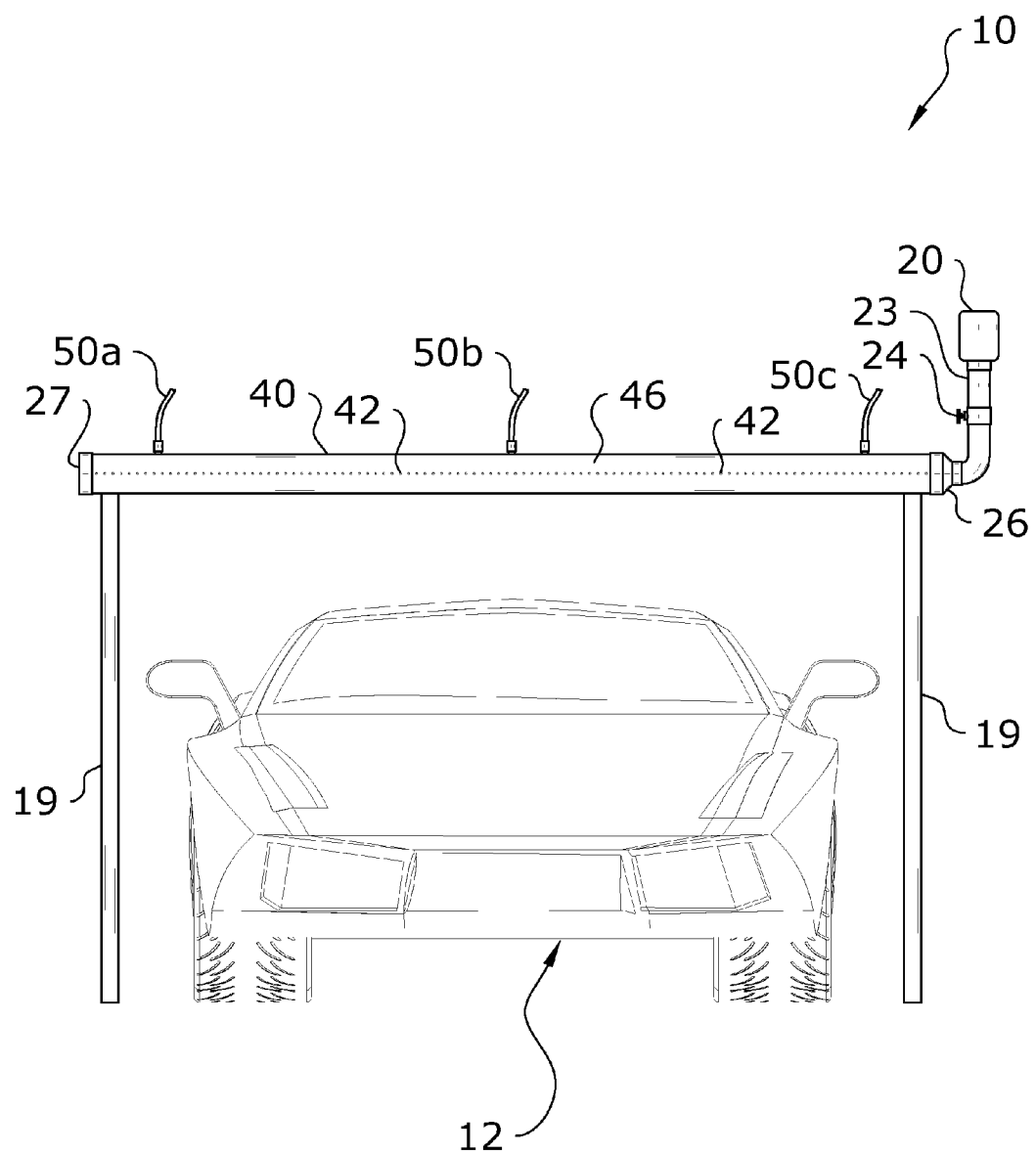
FIG. 3a is a front view of the present invention positioned above a vehicle in a vehicle wash.
Figure 3B:
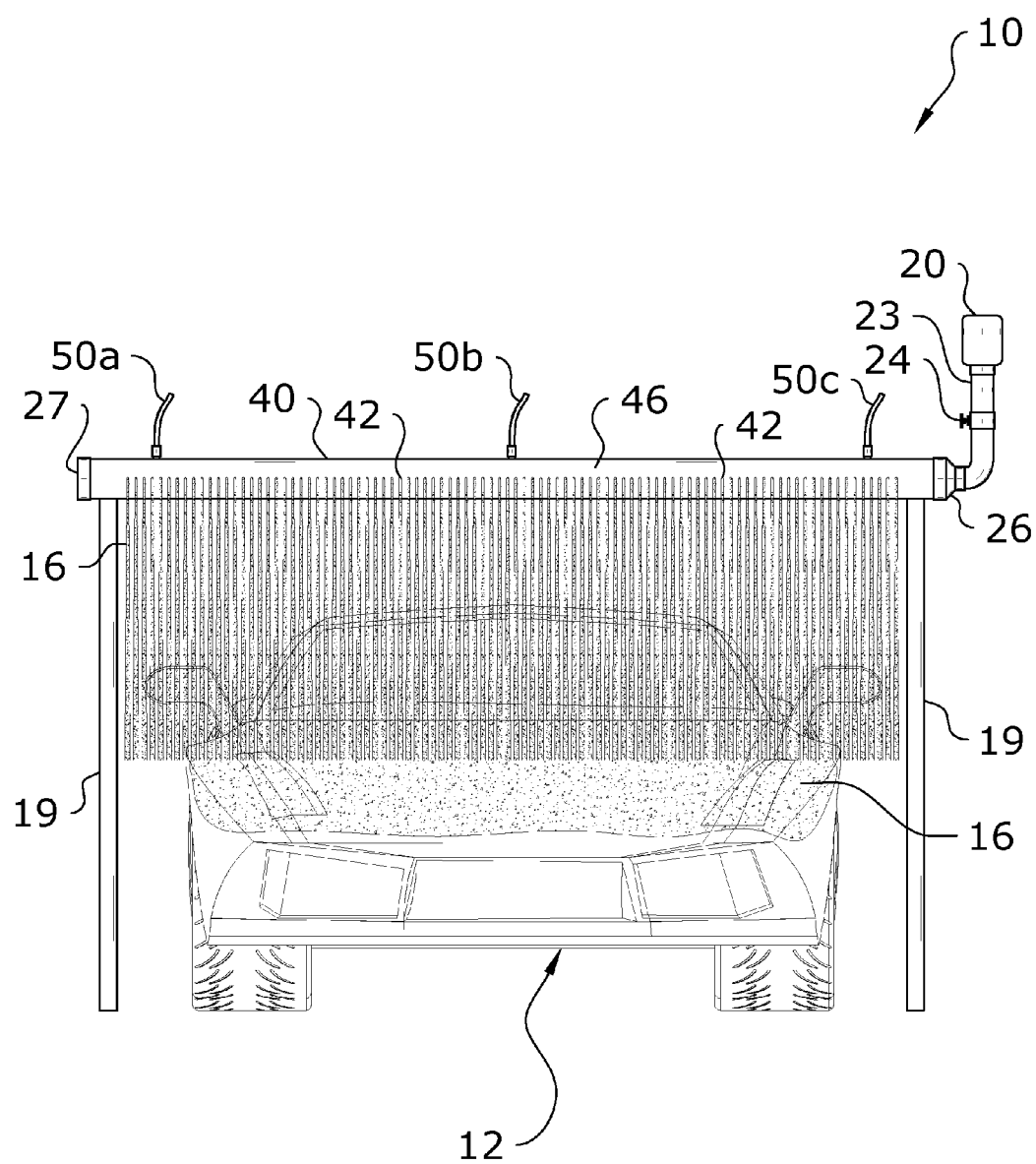
FIG. 3b is a front view of the present invention positioned above a vehicle in a vehicle wash discharging foam outwardly onto the vehicle.
Figure 4:
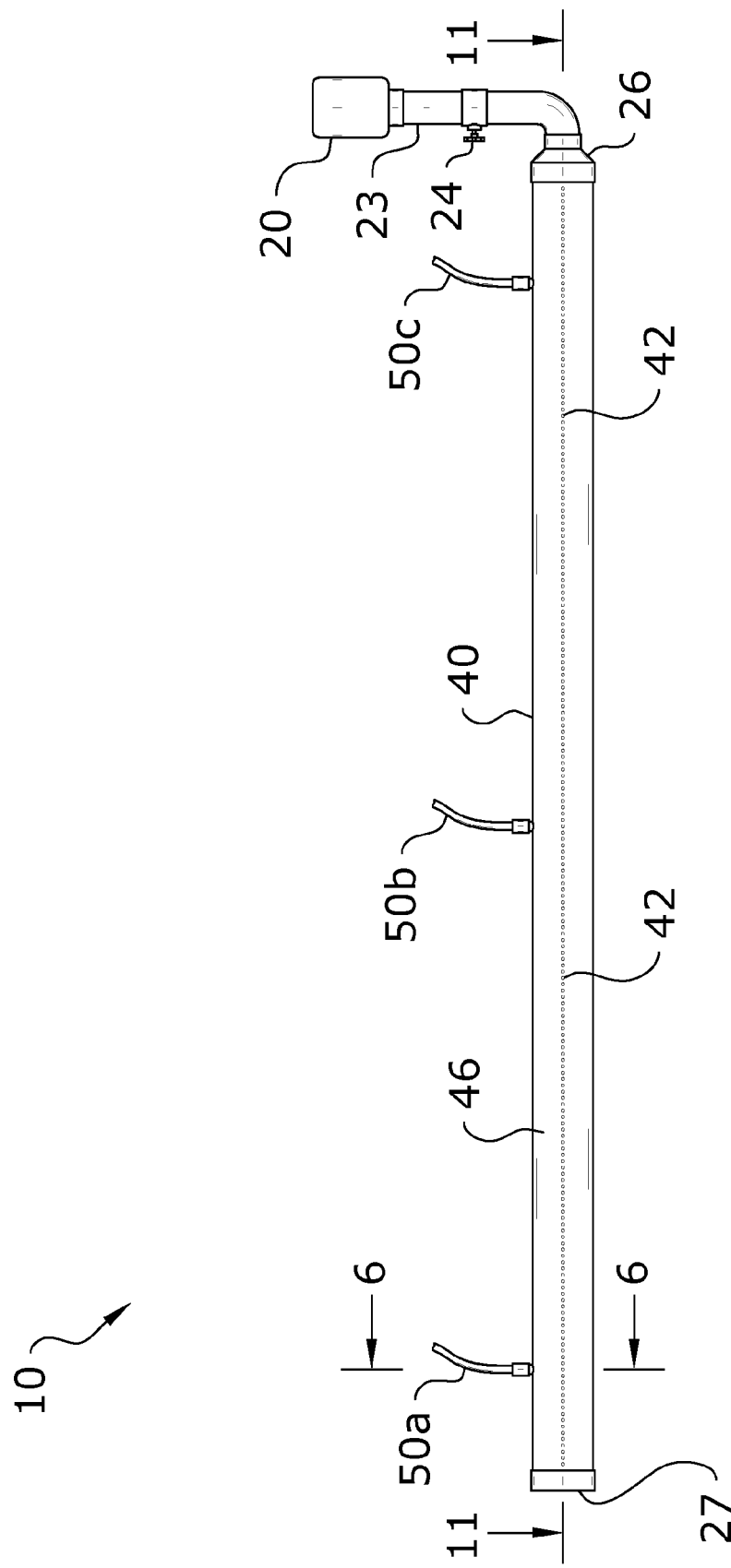
FIG. 4 is a front view of the present invention.

The outer tube 40 further includes at least one foam outlet port 42 fluidly connecting an interior of the outer tube 40 to an exterior of the outer tube 40 to discharge and dispense a volume of discharged foam 16 from the volume of generated foam 14. The at least one outlet port 42 is preferably comprised of a plurality of apertures as illustrated in FIGS. 1, 2 and 4 of the drawings. However, the outlet port 42 may be comprised of a single aperture such as an elongated slot extending along a substantial length of the outer tube 40, wherein the elongated slot is preferably narrow to maintain a desired air pressure within the intermediate space 38 to properly generate the foam. The plurality of foam outlet ports 42 are preferably horizontally aligned along a substantially horizontal line as illustrated in FIG. 4 of the drawings. The plurality of foam outlet ports 42 are preferably equidistantly spaced apart from one another to provide a consistent dispensing of the foam, but may have varying distances. While only a single row of foam outlet ports 42 is illustrated, it can be appreciated that two or more rows of foam outlet ports 42 may be used.

The foam outlet ports 42 extend through a side portion of the outer tube 40 to discharge the volume of discharged foam 16 outwardly to a side of the outer tube 40. The discharged foam 16 may extend initially downwardly at an angle, substantially horizontal or upwardly at an angle initially after being discharged from the foam outlet ports 42.

The plurality of foam outlet ports 42 are positioned within a middle portion of the outer tube 40. The foam outlet ports 42 are preferably positioned below the liquid inlet ports 52 and above the air outlet ports 32 within the inner tube 30. The foam outlet ports 42 are positioned above the maximum level of mixed liquid solution 18 that is able to accumulate within the intermediate space 38 to prevent the accidental dispensing of the mixed liquid solution 18 in a non-foamed manner. It is further preferable that foam outlet ports 42 are positioned between an upper portion of the outer tube 40 and a lower portion of the outer tube 40.

The foam outlet ports 42 are further preferably substantially horizontally aligned to discharge the volume of discharged foam 16 in a substantially horizontal manner outwardly from the outer tube 40 initially wherein the discharged foam 16 eventually is pulled downwardly by gravity to form a curved stream of discharged foam 16.

E. Inner Tube

FIGS. 2 and 4 through 8 illustrate the inner tube 30 having a second length and is substantially sealed within the outer tube 40. As further illustrated in the figures, the inner tube 30 may include an end cover 39. Second length of the inner tube 30 may be the same, longer or shorter than the first length of the outer tube 40. The inner tube 30 has a width that is less than the interior of the outer tube 40 so the inner tube 30 may be positioned inside of the outer tube 40 to form the interior space. The inner tube 30 may be comprised of various types of materials such as plastic, metal, composite and the like.

A pressurized air tube 23 is fluidly connected to the inner end of the inner tube 30. Pressurized air is provided via the pressurized air tube 23 to the air passage 36 within the inner tube 30 to be dispensed into the intermediate passage to form the generated foam 14. A pressurized air source 20 having an air inlet 22 is fluidly connected to the pressurized air tube 23 via an air outlet within the pressurized air source 20. The pressurized air source 20 may be comprised of any device with a fan or similar structure to produce pressurized air. A valve 24 may be positioned within the pressurized air tube 23 to allow for adjustment of the air pressure provided to the inner tube 30 thereby adjusting the characteristics of the generated foam 14 and/or the discharged foam 16 (e.g. smaller or larger bubbles within the foam, increased or decreased chemical content per volume of foam).

The inner tube 30 is at least partially positioned within the outer tube 40 and is preferably almost entirely positioned within the outer tube 40. The intermediate space 38 is formed between the outer surface 34 of the inner tube 30 and the interior surface 44 of the outer tube 40 as illustrated in FIG. 6 of the drawings. The intermediate space 38 preferably surrounds the inner tube 30, however, the intermediate space 38 may not completely surround the inner tube 30.

The intermediate space 38 may have a consistent distance between the outer surface 34 of the inner tube 30 and the interior surface 44 of the outer tube 40 as illustrated in FIG. 6 or a varying distance. The inner tube 30 is further preferably concentrically positioned within the outer tube 40 as illustrated in FIGS. 6 through 8 of the drawings. The inner tube 30 extends through the first end cover 26 in a sealed manner and may be supported above the bottom surface of the interior surface 44 of the outer tube 40 by support members along the length of the inner tube 30 extending between the outer tube 40 and the inner tube 30.

The cross sectional shape of the inner tube 30 is preferably the same as a cross sectional shape of the outer tube 40. However, the cross sectional shape of the inner tube 30 may different from the cross sectional shape of the outer tube 40. It is preferable that the inner tube 30 be comprised of a circular cross sectional shape and the outer tube 40 is comprised of a circular cross sectional shape. The inner tube 30 may be comprised of various other shapes such as, but not limited to, oval, triangular, rectangular, square and the like.

F. Air Outlet Port(s)

Figure 5:
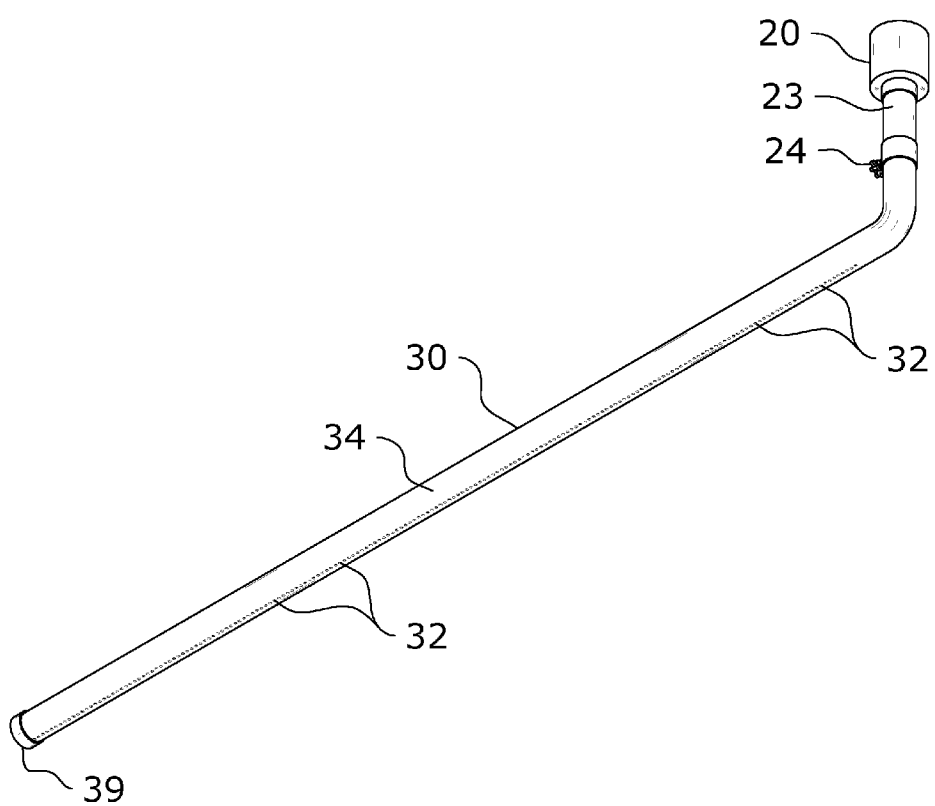
FIG. 5 is a lower perspective view of the inner tube and air pressure assembly.

The inner tube 30 includes at least one air outlet port 32 fluidly connecting the air passage 36 to the intermediate space 38 to discharge the pressurized air into the intermediate space 38 thereby mixing with the mixed liquid solution 18 to form the generated foam 14. It is preferable that a plurality of air outlet ports 32 extend into the inner tube 30 along a substantial portion of the length of the inner tube 30 as best illustrated in FIG. 5 of the drawings.

The plurality of air outlet ports 32 are preferably comprised of a plurality of apertures that extend through the lower portion of the inner tube 30. The apertures may be equidistantly spaced apart from one another or have a varying distance apart. The air outlet ports 32 extend downwardly through the lower portion of the inner tube 30 to disperse pressurized air into a lower portion of the intermediate chamber where the mixed liquid solution 18 falls down to after passing over the outer surface 34 of the inner tube 30. The air outlet ports 32 preferably extend downwardly in a substantially vertical manner through the bottom portion of the inner tube 30 to dispense the pressurized air directly into the center of the mixed liquid solution 18 that collects at the bottom of the outer tube 40 as illustrated in FIGS. 6 through 8 of the drawings. The concentric axis of the air outlet ports 32 and the liquid inlet ports 52 are preferably aligned along the same plane as illustrated in FIGS. 6 through 8.

G. Deflector

Figure 9:
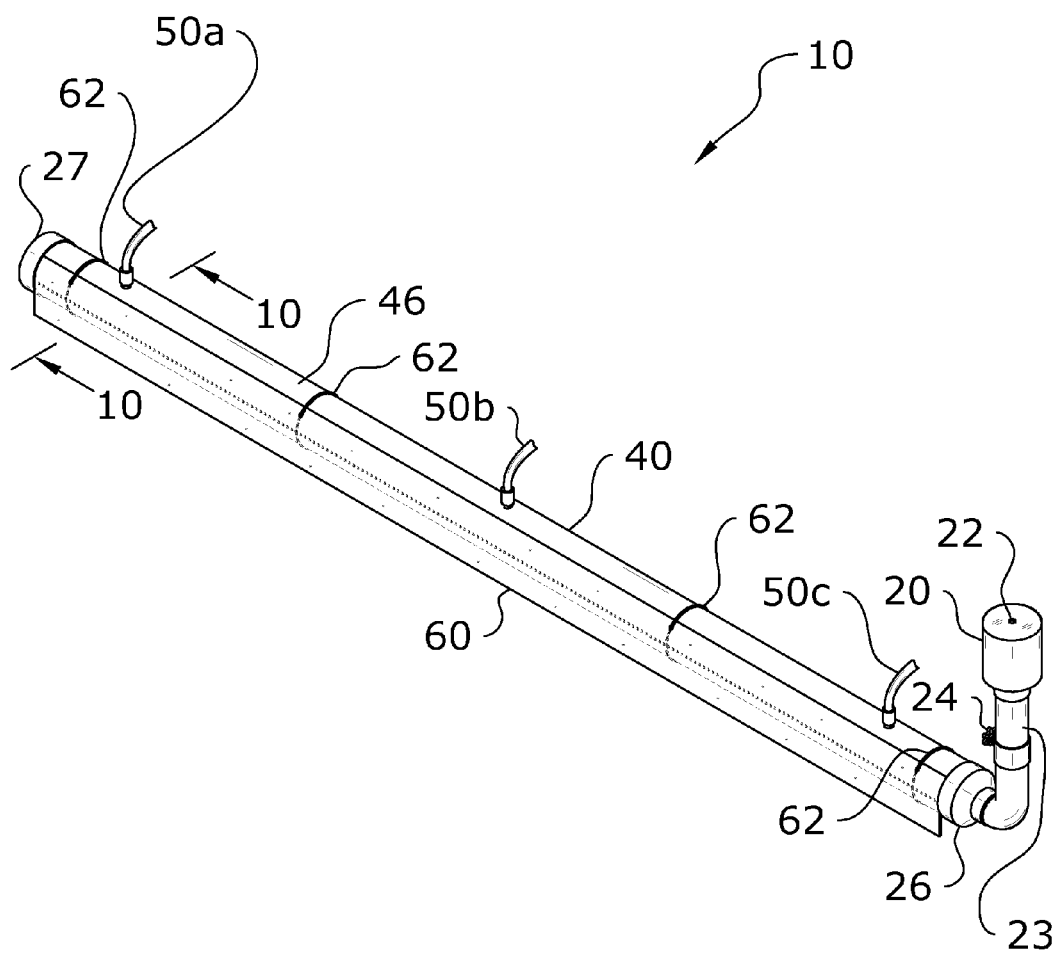
FIG. 9 is an upper perspective view of the present invention including a deflector to deflect the discharged foam downwardly.

FIGS. 9 and 10 illustrate an alternative embodiment including a deflector 60 attached to the exterior of the outer tube 40. The deflector 60 is comprised of a sheet of material (e.g. plastic, clear plastic, metal) that is attached to the outer tube 40 and extends substantially vertically in front of the foam outlet ports 42. FIGS. 9 and 10 illustrate the usage of attachment straps 62 surrounding the outer tube 40 to connect the deflector 60, however, various other attachment devices may be utilized. The deflector 60 is positioned a distance away from the foam outlet ports 42 to allow the foam to be discharged. However, when the foam engages the inner surface of the deflector 60, the foam falls downwardly in sheets along the inner surface and then onto the vehicle 12.

H. Operation of Preferred Embodiment

In use, pressurized air is provided to the inner tube 30 by the pressurized air source 20 at the desired pressure. The mixed liquid solution 18 enters the intermediate space 38 above the inner tube 30 and falls upon the upper surface of the inner tube 30 as shown in FIG. 7 of the drawings. The mixed liquid solution 18 is divided between the opposing sides of the inner tube 30 and falls downwardly to the bottom of the intermediate space 38 and clinging to the outer surface 34 of the inner tube 30 until near the air outlet ports 32 within the inner tube 30 as shown in FIG. 7. As the mixed liquid solution 18 approaches the air outlet ports 32, the pressurized air discharged from the air outlet ports 32 mixes with the mixed liquid solution 18 to form the generated foam 14. The generated foam 14 expands and floats above the collected mixed liquid solution 18 in the lower portion of the intermediate space 38 because of the lighter density thereof. The generated foam 14 moves upwardly until approaching the foam outlet ports 42 wherein the pressure within the intermediate space 38 is greater than the atmospheric pressure thereby resulting in the generated foam 14 being discharged at a velocity and flowrate through the foam outlet ports 42 as illustrated in FIGS. 8 and 10 of the drawings. The discharged foam 16 then falls towards the vehicle 12 and engages the surface of the vehicle 12 for the desired application of foam (e.g. presoak, wash, waxing, conditioning, etc.). The discharged foam 16 that is collected on the vehicle 12 is then rinsed off. The user may adjust the flowrate of the mixed liquid solution 18 using a flowrate control device and the air pressure using the valve 24 to achieve various types of foam characteristics for the discharged foam 16.

Unless otherwise defined, all technical and scientific terms used herein have the same meaning as commonly understood by one of ordinary skill in the art to which this invention belongs. Although methods and materials similar to or equivalent to those described herein can be used in the practice or testing of the present invention, suitable methods and materials are described above. All publications, patent applications, patents, and other references mentioned herein are incorporated by reference in their entirety to the extent allowed by applicable law and regulations. The present invention may be embodied in other specific forms without departing from the spirit or essential attributes thereof, and it is therefore desired that the present embodiment be considered in all respects as illustrative and not restrictive. Any headings utilized within the description are for convenience only and have no legal or limiting effect.

The invention claimed is:

1. A vehicle wash foam applicator, comprising:
   an outer tube;
   wherein said outer tube includes at least one foam outlet port fluidly connecting an interior of said outer tube to an exterior of said outer tube, wherein said at least one foam outlet port is adapted to discharge a volume of discharged foam from a volume of generated foam within said outer tube;
   at least one liquid inlet port fluidly connected to said interior of said outer tube, wherein said at least one liquid inlet port is adapted to be fluidly connected to a liquid source;
   an inner tube, wherein said inner tube is at least partially positioned within said outer tube, and wherein an intermediate space is formed between an outer surface of said inner tube and an interior surface of said outer tube; and
   wherein said inner tube includes an air passage and at least one air outlet port fluidly connecting said air passage to said intermediate space, wherein said at least one air outlet port is adapted to provide pressurized air to said intermediate space;
   wherein said at least one liquid inlet port is positioned within an upper portion of said outer tube, and wherein said at least one liquid inlet port is adapted to dispense a liquid downwardly in a substantially vertical manner onto a center upper surface of said inner tube.

2. The vehicle wash foam applicator of claim 1, wherein said intermediate space surrounds said inner tube.

3. The vehicle wash foam applicator of claim 1, wherein said intermediate space has a consistent distance between said outer surface of said inner tube and said interior surface of said outer tube.

4. The vehicle wash foam applicator of claim 1, wherein said inner tube is concentrically positioned within said outer tube.

5. The vehicle wash foam applicator of claim 1, wherein a cross sectional shape of said inner tube is the same as a cross sectional shape of said outer tube.

6. The vehicle wash foam applicator of claim 1, wherein said inner tube and/or said outer tube have a circular cross sectional shape.

7. The vehicle wash foam applicator of claim 1, wherein said at least one air outlet port is positioned within a lower portion of said inner tube.

8. The vehicle wash foam applicator of claim 1, wherein said at least one foam outlet port is positioned within a middle portion of said outer tube.

9. The vehicle wash foam applicator of claim 1, wherein said at least one foam outlet port is positioned between said upper portion of said outer tube and a lower portion of said outer tube.

10. The vehicle wash foam applicator of claim 1, wherein said at least one foam outlet port extends substantially horizontally to discharge said volume of discharged foam in a substantially horizontal manner outwardly from said outer tube.

11. The vehicle wash foam applicator of claim 1, wherein said at least one foam outlet port is comprised of an elongated slot that extends along a substantial length of said outer tube.

12. The vehicle wash foam applicator of claim 1, wherein said at least one foam outlet port is comprised of a plurality of foam outlet ports.

13. The vehicle wash foam applicator of claim 12, wherein said plurality of foam outlet are aligned along a substantially horizontal line.

14. The vehicle wash foam applicator of claim 12, wherein said plurality of foam outlet ports extend through a side portion of said outer tube to discharge said volume of discharged foam outwardly to a side of said outer tube.

15. The vehicle wash foam applicator of claim 12, wherein said plurality of foam outlet are equidistantly spaced apart.

16. The vehicle wash foam applicator of claim 12, wherein said at least one air outlet port is comprised of a plurality of air outlet ports.

17. The vehicle wash foam applicator of claim 12, wherein said at least one air outlet port extends downwardly through a lower portion of said inner tube.

18. The vehicle wash foam applicator of claim 12, wherein said at least one air outlet port extends downwardly in a substantially vertical manner through a bottom portion of said inner tube.

19. A vehicle wash foam applicator, comprising:

an outer tube having a first length;

wherein said outer tube includes at least one foam outlet port fluidly connecting an interior of said outer tube to an exterior of said outer tube;

wherein said at least one foam outlet port is positioned within a middle portion of said outer tube;

wherein said at least one foam outlet port is adapted to discharge a volume of discharged foam from a volume of generated foam within said outer tube;

wherein said at least one foam outlet port extends substantially horizontally to discharge said volume of discharged foam in a substantially horizontal manner outwardly from said outer tube;

wherein said at least one foam outlet port is comprised of a plurality of foam outlet ports;

at least one liquid inlet port fluidly connected to said interior of said outer tube, wherein said at least one liquid inlet port is adapted to be fluidly connected to a liquid source;

wherein said at least one liquid inlet port is positioned within an upper portion of said outer tube;

an inner tube having a second length, wherein said inner tube is at least partially positioned within said outer tube, wherein an intermediate space is formed between an outer surface of said inner tube and an interior surface of said outer tube, and wherein said intermediate space surrounds said inner tube; and wherein said at least one liquid inlet port is adapted to dispense a liquid downwardly onto a center upper surface of said inner tube;

wherein said inner tube includes an air passage and at least one air outlet port fluidly connecting said air passage to said intermediate space, wherein said at least one air outlet port is adapted to provide pressurized air to said intermediate space;

wherein said at least one air outlet port is positioned within a lower portion of said inner tube;

wherein said at least one air outlet port extends downwardly through said lower portion of said inner tube adapted to disperse pressurized air into a lower portion of said intermediate space.

20. A vehicle wash foam applicator, comprising:

an outer tube;

wherein said outer tube includes a plurality of foam outlet ports fluidly connecting an interior of said outer tube to an exterior of said outer tube, wherein said plurality of foam outlet ports are adapted to discharge a volume of discharged foam from a volume of generated foam within said outer tube;

a plurality of liquid inlet ports fluidly connected to said interior of said outer tube, wherein said plurality of liquid inlet ports are adapted to be fluidly connected to a liquid source;

an inner tube, wherein said inner tube is at least partially positioned within said outer tube, and wherein an intermediate space is formed between an outer surface of said inner tube and an interior surface of said outer tube; and wherein said inner tube includes an air passage and at least one air outlet port fluidly connecting said air passage to said intermediate space, wherein said at least one air outlet port is adapted to provide pressurized air to said intermediate space.

21. The vehicle wash foam applicator of claim 20, wherein said intermediate space surrounds said inner tube.

22. The vehicle wash foam applicator of claim 20, wherein said intermediate space has a consistent distance between said outer surface of said inner tube and said interior surface of said outer tube.

23. The vehicle wash foam applicator of claim 20, wherein said inner tube is concentrically positioned within said outer tube.

24. The vehicle wash foam applicator of claim 20, wherein a cross sectional shape of said inner tube is the same as a cross sectional shape of said outer tube.

25. The vehicle wash foam applicator of claim 20, wherein said inner tube and/or said outer tube have a circular cross sectional shape.

26. The vehicle wash foam applicator of claim 20, wherein said plurality of liquid inlet ports are positioned within an upper portion of said outer tube, and wherein said plurality of liquid inlet ports are adapted to dispense said liquid downwardly onto an upper surface of said inner tube.

27. The vehicle wash foam applicator of claim 20, wherein said at least one air outlet port is positioned within a lower portion of said inner tube.

28. The vehicle wash foam applicator of claim 20, wherein said plurality of foam outlet ports are positioned within a middle portion of said outer tube.

29. The vehicle wash foam applicator of claim 28, wherein said plurality of foam outlet ports are positioned between an upper portion of said outer tube and a lower portion of said outer tube.

30. The vehicle wash foam applicator of claim 20, wherein said plurality of foam outlet ports extend substantially horizontally to discharge said volume of discharged foam in a substantially horizontal manner outwardly from said outer tube.

31. The vehicle wash foam applicator of claim 20, wherein said plurality of foam outlet ports are aligned along a substantially horizontal line.

32. The vehicle wash foam applicator of claim 20, wherein said plurality of foam outlet ports extend through a side portion of said outer tube to discharge said volume of discharged foam outwardly to a side of said outer tube.

33. The vehicle wash foam applicator of claim 20, wherein said plurality of foam outlet ports are equidistantly spaced apart.

34. The vehicle wash foam applicator of claim 20, wherein said at least one air outlet port is comprised of a plurality of air outlet ports.

35. The vehicle wash foam applicator of claim 20, wherein said at least one air outlet port extends downwardly through a lower portion of said inner tube.

36. The vehicle wash foam applicator of claim 20, wherein said at least one air outlet port extends downwardly in a substantially vertical manner through a bottom portion of said inner tube.

* * * * *